(12) United States Patent
Johnson et al.

(10) Patent No.: US 10,375,285 B2
(45) Date of Patent: *Aug. 6, 2019

(54) CAMERA SUBASSEMBLY DUST AND DEFECT DETECTION SYSTEM AND METHOD

(71) Applicant: Kodak Alaris Inc., Rochester, NY (US)

(72) Inventors: Robert Johnson, Webster, NY (US); John Jamieson, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,311

(22) Filed: Mar. 15, 2018

(65) Prior Publication Data

US 2018/0205856 A1    Jul. 19, 2018

Related U.S. Application Data

(63) Continuation of application No. 14/752,051, filed on Jun. 26, 2015, now Pat. No. 9,948,842.

(51) Int. Cl.
*H04N 5/225* (2006.01)
*G06T 7/00* (2017.01)

(52) U.S. Cl.
CPC ........... *H04N 5/2256* (2013.01); *G06T 7/001* (2013.01); *G06T 2207/10152* (2013.01); *G06T 2207/30164* (2013.01)

(58) Field of Classification Search
CPC .................. H04N 5/2256; G06T 7/001; G06T 2207/10152; G06T 2207/30164

USPC .......................................................... 348/92
See application file for complete search history.

(56) References Cited

U.S. PATENT DOCUMENTS

| | | | | |
|---|---|---|---|---|
| 7,369,240 | B1* | 5/2008 | Abbott | G01N 21/896 |
| | | | | 356/429 |
| 8,991,700 | B2* | 3/2015 | Harbison | G06K 7/10821 |
| | | | | 235/383 |
| 9,888,696 | B2* | 2/2018 | Lindee | A22C 17/0033 |

(Continued)

OTHER PUBLICATIONS

Easton et al, Smart digital camera for product quality inspection (Year: 1996).*

(Continued)

*Primary Examiner* — Shan E Elahi
(74) *Attorney, Agent, or Firm* — Hogan Lovells US LLP (57) ABSTRACT

Systems and methods facilitate iteratively inspecting a high resolution image of a camera subassembly glass element, to determine whether dust is present, and cleaning of same. By examining the size, number, and location of the dust particles it can be determined whether the dust is likely to cause issues when the camera subassembly is integrated into a fully assembled document scanner. Other anomalies, contaminants, and defects which could affect camera image quality, such as scratches on the glass covering, can also be detected. Software may control the capturing of the high resolution images of the camera subassembly glass and can determine a fail state if the anomaly is above a predetermined threshold. The systems and method can be used as acceptance criteria of individual camera subassemblies from a manufacturer.

20 Claims, 7 Drawing Sheets

(56) References Cited

U.S. PATENT DOCUMENTS

| | | | | |
|---|---|---|---|---|
| 2002/0025172 A1* | 2/2002 | Tsuda | ............ | G03B 27/32 |
| | | | | 399/8 |
| 2004/0037457 A1* | 2/2004 | Wengender | ...... | G06T 7/0002 |
| | | | | 382/141 |
| 2004/0175038 A1* | 9/2004 | Bonner | ........ | G06K 9/00973 |
| | | | | 382/181 |
| 2005/0212200 A1* | 9/2005 | Van Nice | ...... | B65H 29/60 |
| | | | | 271/265.04 |
| 2005/0275909 A1* | 12/2005 | Takayama | ...... | H04N 1/40056 |
| | | | | 358/509 |
| 2008/0164314 A1* | 7/2008 | Meier | ........ | G06K 7/10722 |
| | | | | 235/462.1 |

OTHER PUBLICATIONS

Zhang et al, Surface flaws detection algorithms for large aperture optical element (Year: 2015).*
Chinese Office Action dated Sep. 21, 2018 in Chinese Application No. 201610483732.X.

* cited by examiner

| RESULTS: | 1 | 2 | 3 | 4 | 5 | 6 | 7 |
|---|---|---|---|---|---|---|---|
| AVERAGE HORIZ. SEGMENT LENGTH | 2.66667 | 2.00000 | 2.25000 | 1.00000 | 4.22222 | 3.33333 | 1.00000 |
| AVERAGE VERT. SEGMENT LENGTH | 2.00000 | 1.33333 | 2.25000 | 1.00000 | 5.42857 | 2.50000 | 1.00000 |
| AREA | 8.00000 | 4.00000 | 9.00000 | 1.00000 | 38.00000 | 10.00000 | 1.00000 |

CAMERA SUBASSEMBLY DUST AND DEFECT DETECTION SYSTEM AND METHOD

CROSS-REFERENCE TO RELATED APPLICATION

This application is a continuation of U.S. patent application Ser. No. 14/752,051 ("Camera Subassembly Dust and Defect Detection System and Method"), filed Jun. 26, 2015, and which is incorporated by reference herein in its entirety.

FIELD OF THE INVENTION

The present invention relates to defect detection during manufacturing of camera subassemblies, and in particular to a system and method for detecting dust and defects in a camera subassembly prior to installation within an imaging system product.

BACKGROUND OF THE INVENTION

The main imaging components of a document scanner are often bundled together and manufactured as a "camera subassembly" by OEM manufacturers. The subassemblies can then be shipped to a final manufacturing site where they are integrated, or built into, the rest of the document scanner.

Dust contamination is always a concern when manufacturing camera subassemblies for installation into an imaging device, as it can cause a decrease in the quality of images captured with the device. Other contaminants, such as scratches on the glass cover, may also occur during manufacturing and similarly lead to reduced image quality. A typical subassembly is comprised of a CCD camera, reflectors, associated electronics, and a glass cover—all enclosed in an air tight plastic body. The subassembly may also comprise LED illumination. The imaging sensor could be a CIS sensor (as opposed to CCD), and the illumination could be CCFL (as opposed to LED). In particular, if dust particles get inside the subassembly during the manufacturing process they can move around and frequently end up on the underside of the glass surface. This can often be the result of shipping and handling of the camera subassembly or the fully assembled imaging device, such as a document scanner. Any dust particles present on the glass surface during scanning or image capturing, if in the right location and sufficiently large, can result in poor quality images. For example, the dust particles may show up as vertical streaks present in captured images.

A common technique for addressing streaks in the imaging path of a CCD camera is to perform an image calibration that accounts for the presence of the dust. However, the dust particles are not stationary and can move within the camera subassembly. If one or more dust particles move, the imaging device, such as a scanner, would then be calibrated to account for a streak that no longer exists while leaving streaks caused by the dust particles at their new positions unaccounted for. Because the subassembly is sealed, it may be difficult to remove the dust or fully compensate for its presence within the camera subassembly once the subassembly is installed into the imaging device.

What is needed is an accurate, automated method of detecting dust particles in the camera subassembly before it is accepted from the manufacturer and assembled in the imaging device. Currently, a visual inspection of the camera assemblies before installation is performed using direct illumination from an external source. However, this visual inspection technique has several drawbacks. It is very labor-intensive, dust particles can often be missed, and it is difficult to consistently apply criteria used in making a determination as to whether a subassembly is acceptable or not. For example, the extent of analysis and final determination may vary depending on the individual conducting the visual inspection, as each different inspector may apply different criteria, or some may be more thorough than others. Thus, an accurate, automated method of inspecting the camera subassembly for dust particles prior to installation into an image device is needed.

SUMMARY OF THE INVENTION

The present invention is directed to a system and method for performing defect detection on camera subassemblies prior to installation in imaging devices. In particular, the system and method detect dust, scratches, or other defects on a camera subassembly by placing the subassembly into a fixture, illuminating the subassembly, capturing high resolution images, and analyzing these images to detect the presence and severity of any defects.

Camera subassemblies are typically made up of a CCD camera or other image sensing elements, optional illumination elements, reflectors, associated electronics, and a glass cover—all enclosed in an air tight plastic body. These subassemblies are then included in various imaging devices, including document scanners, personal scanners, and digital cameras. As noted above, dust, scratches or other defects in the camera subassembly can lead to reduced quality in images captured by the imaging devices. Once the subassembly is installed in the imaging device, it may be difficult to sufficiently compensate for the dust and defects, decreasing the quality and usefulness of the imaging device. The system and method described herein provide for automatic detection and analysis of defects in the subassembly prior to installation in an imaging device. Subassemblies that have significant defects, or that have defects that may be difficult to compensate for by digital image calibration techniques, can be rejected prior to installation. Thus, the system and method may be used to help prevent installation of camera assemblies having significant defects, thereby increasing the quality of digital imaging devices.

The system includes a fixture specially designed to hold a camera subassembly. Power to the camera subassembly is supplied through a specially designed circuit board and standard cabling. The circuit board controls the illumination level of LEDs either within the subassembly unit under test or mounted or attached to the fixture. The specially designed fixture also holds a high performance area camera (e.g. a CCD array camera) or any high resolution camera at a predetermined height and angle to the camera subassembly. An area camera is a CCD array camera. It takes a picture in 2-dimensions (rectangle), as opposed to a single line camera.

The camera height is determined based on the requirement for field of view (with the goal of having the whole camera subassembly to be imaged) and the requirement for an effective resolution (>=600 dpi). The angle needs to be 90 degrees (perpendicular to the glass on the camera subassembly). The focal point is fixed when the fixture is assembled. There is a software check of overall magnification to ensure the integrity of the system is maintained. One or more high resolution images of the camera subassembly glass, backlit by LEDs of the unit-under-test, is captured and sent to a processing unit. The processing unit analyzes the high resolution images by executing a Particle Detection and Defect Characterization software module, which locates and tabulates the characteristics of anomalies found at the focal plane of the camera subassembly glass. The Particular Detection and Defect Characterization module further distinguishes dust and scratches, and determines the severity of the anomalies. The Particular Detection and Defect Characterization module analyzes the acquired high resolution images with respect to acceptance criteria, and the camera subassembly is accepted or rejected before it is integrated with the rest of the scanner based on this analysis.

DETAILED DESCRIPTION OF THE INVENTION

The system and method described herein include a fixture for holding a camera subassembly to be inspected, the fixture also holding a high resolution camera configured to capture high resolution images of the camera subassembly. A control circuit board is provided, which provides power to the camera subassembly and controls one or more illumination elements during the inspection process. The high resolution camera is connected to an inspection control device, which includes a processor and memory. The control device executes software modules stored in the memory device to control the high resolution camera, capture high resolution images of the camera subassembly, and perform analysis on the captured images. In particular, the control device includes a Particle Detection and Defect Characterization software module that uses machine vision technology to locate suitable areas of the subassembly glass to examine. In certain embodiments the software automatically detects and zooms in on regions of interest. Although manual selection should not be needed, in certain embodiments manual selection can be undertaken by changing the ROI location by editing the text an initialization (.INI) file. Dynamic region-of-interest (ROI) generation provides robustness against small unit-to-unit differences in the positioning of camera subassemblies in the fixture. Dynamic region-of-interest (ROI) generation uses a coordinate system, which is really a "map" or "guide" of what the camera subassembly looks like. This map knows two reference points on the camera subassembly and where the ROI should be located relative to those reference points.

After the camera subassembly is inserted into the fixture and the image is taken, the two reference points on the camera subassembly image are found. The position of the ROI, i.e., the rectangular glass portion of the camera subassembly which may contain dust/defects, is then located using the knowledge of the coordinate system. In this way even small rotational differences and small X-Y positional differences can be taken into account for each camera subassembly that is inserted into the fixture and tested.

The control unit, through the Particle Detection and Defect Characterization module, performs adaptive thresholding to locate and measure anomalies as small as 0.05 mm$^2$ at the focal plane. Adaptive thresholding is measuring code values in the image. The image is a single-channel (mono) image, 8-bit. Thus, the code values for the luminance channel range from 0 to 255. Illuminated dust and defects are bright specular highlights and have high code values compared to the surrounding dark background, which have low code values. The initial threshold is set to 25 code values in the .INI file, as determined empirically on a reference Dust Detection System. The threshold level can be changed iteratively using a LabVIEW thresholding utility.

An iterative process is used to distinguish surface dust from dust particles on the inside of the glass cover, and to estimate the total number of dust particles within the camera subassembly. Predetermined particle characteristics are used to distinguish dust from scratches or other contaminants in a particle identification process. Data features about each located dust particle or other defect is stored in the memory. The stored features include number of defects, size of defects, type of defects, and location of defects. These features may be stored as metadata associated with the captured images analyzed. Once the particle identification process is complete, the control unit applies acceptance criteria, the metadata such as particle size and x-y location and image data are saved in multiple formats, and a proper course of action is taken for the camera subassembly. The x-y location may be determined relative to a certain point of the glass cover, frame, point on a camera subassembly, or any other specified location. For example, the x-y locations may be determined relative to the upper-left corner of the glass cover, or relative to the center point of the subassembly being analyzed.

In particular, the control unit determines, based on application of the criteria, whether the amount and size of defects renders the camera assembly unacceptable for installation into an imaging device. If an initial measurement reveals any dust or scratches, a cleaning operation is performed and the unit is retested. By cleaning the unit, dust on the surface of the lens should be at least partly removed, and would not show up again in the same position on subsequent tests. Dust within the camera assembly would likely not be affected by the cleaning procedure, and would likely show up in the same position on subsequent tests. By this process of cleaning, surface dust and defects may therefore be distinguished from dust or defects within the subassembly. This process may be iterative and may continue for a number of cycles programmable by the user, or may continue until cleaning lowers the amount of dust detected below a programmable or user-selected threshold. Defects that remain after a programmable number of cleaning cycles may be classified as potentially detrimental defects and may undergo further analysis by the software. The control unit may contain manual input to allow a user to set the user-selected threshold for dust detection, and may also allow the user to input a preferred or maximum number of cleaning cycles for the unit to operate. Additionally, the control unit may contain preset values for the dust detection threshold and number of cleaning cycles. The criteria and threshold can be set as determined necessary for the particular camera and imaging device application. For example, in certain embodiments for dust, the criteria is set at the maximum segment length and the threshold is 3 particles >=0.20 mm, found anywhere within the ROI. When this threshold is met, the camera subassembly is determined unacceptable for installation into an imaging device. Additional or alternative criteria and thresholds can be set for dust as well as other defects.

Figure 1A:
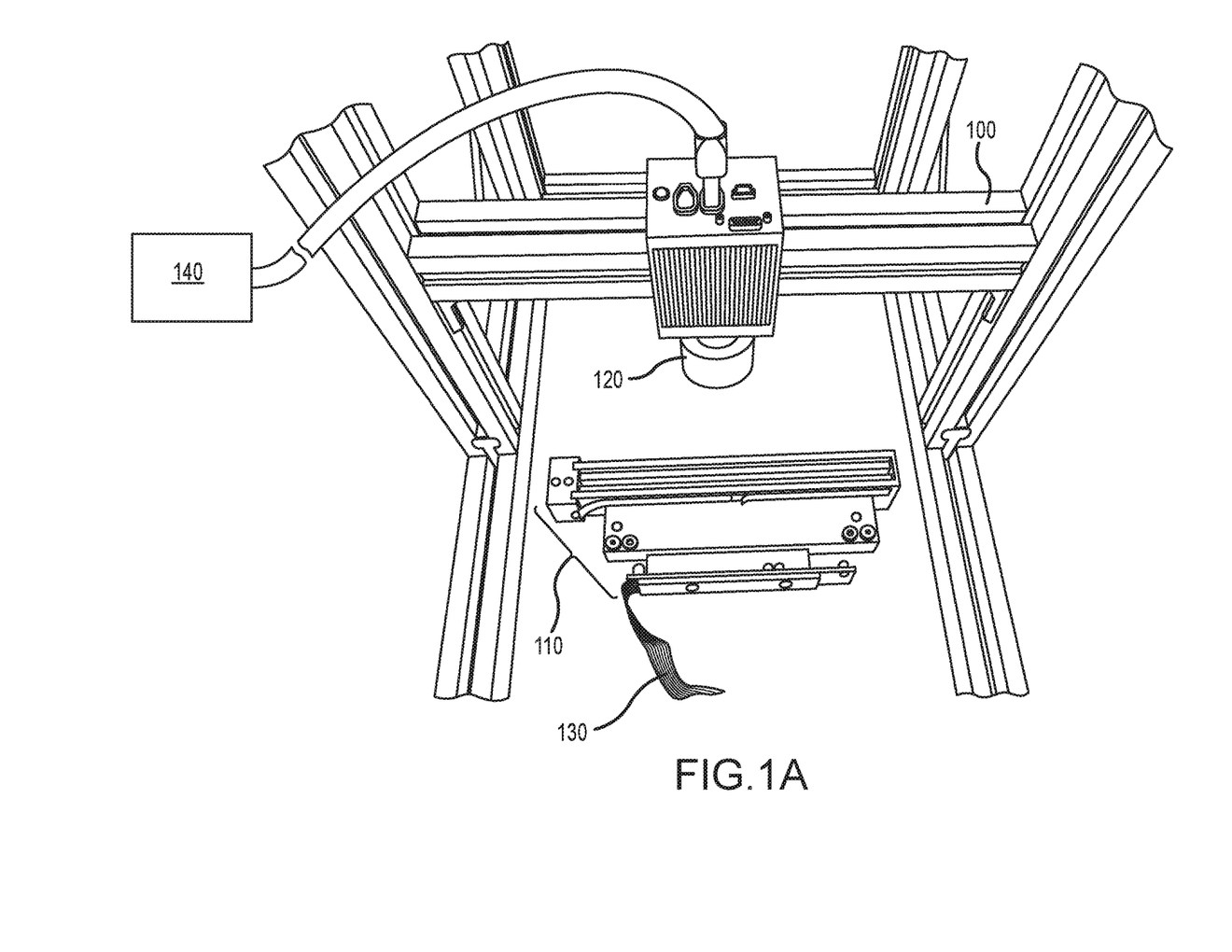
FIG. 1A provides a picture of a camera subassembly under test with internal illumination elements.
Figure 1B:
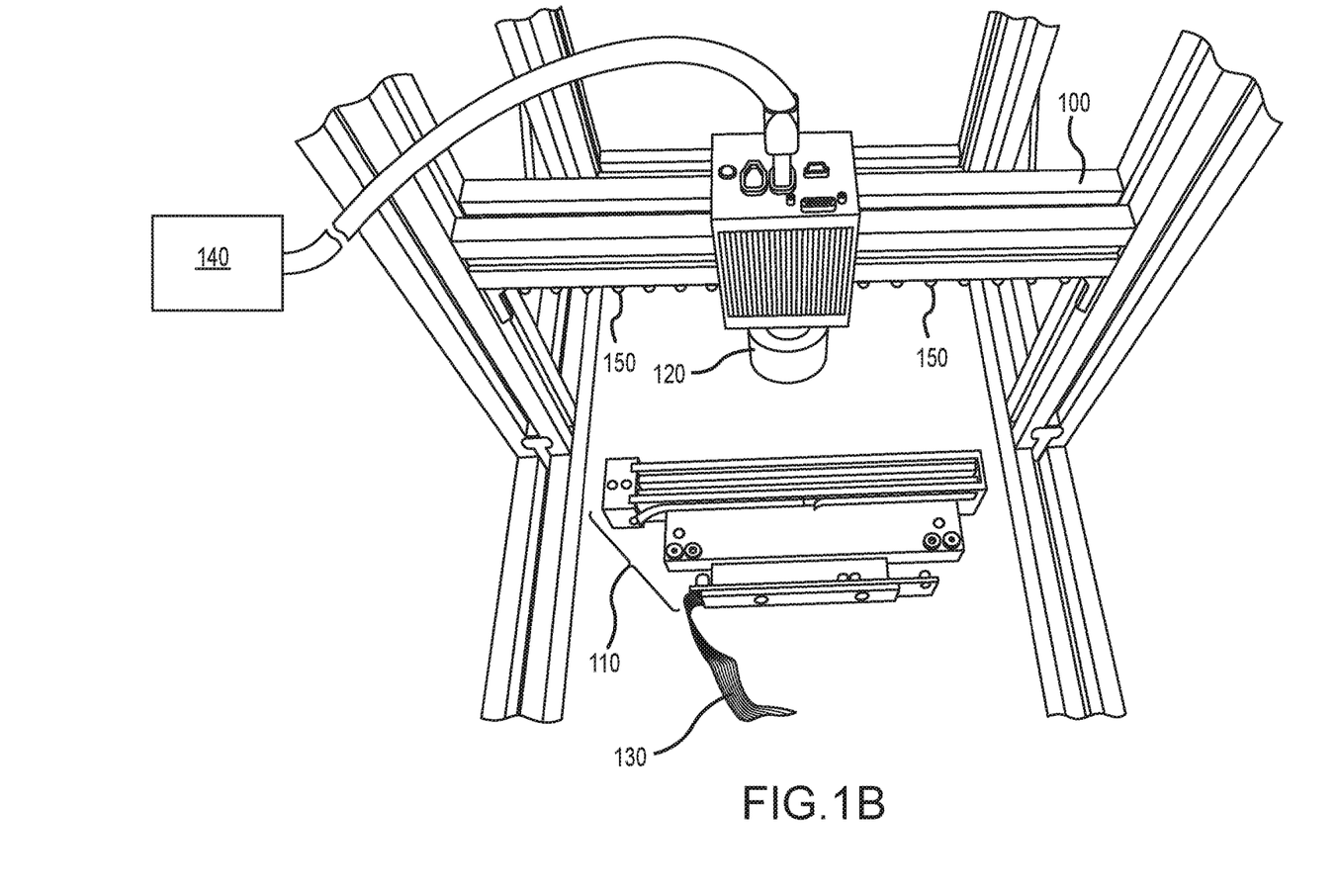
FIG. 1B provides a picture of a camera subassembly with external illumination elements.

As seen in FIGS. 1A and 1B, the system includes a fixture assembly 100 configured to hold both a camera subassembly 110 under test and a high resolution imaging camera 120. The high resolution imaging camera 120 is adjustably mounted to the fixture 100, such that the height and angle of the high resolution imaging camera may be changed. However, in certain embodiments, the fixture is provided as a complete unit with the height and angle fixed. Control circuitry 130 connects to the camera subassembly and supplies power and control signals to the camera subassembly 110 when held in the fixture 100. The control circuitry 130, in particular, controls one or more illumination elements to provide backlight illumination to the camera subassembly while in the fixture assembly. As seen in FIG. 1A, the illumination elements may be located within the camera subassembly 110. Alternatively, as seen in FIG. 1B, the illumination elements 150 may by mounted on or attached to the fixture 100. If the illumination elements 150 are mounted on fixture 100, the illumination elements may be mounted in any position or attached at any point on the fixture. In certain preferred embodiments the illumination elements are LEDs and the LED output level is fixed. While the subassembly is illuminated by the illumination element, the high resolution imaging camera 120 is controlled by a control unit 140, connected to the camera 120, to capture high resolution images of the camera subassembly. The control unit may be connected to the camera 120 through cables or wires, or may be wirelessly connected the camera 120. These high resolution images are passed to the control unit 140 for processing and analysis.

Figure 2:
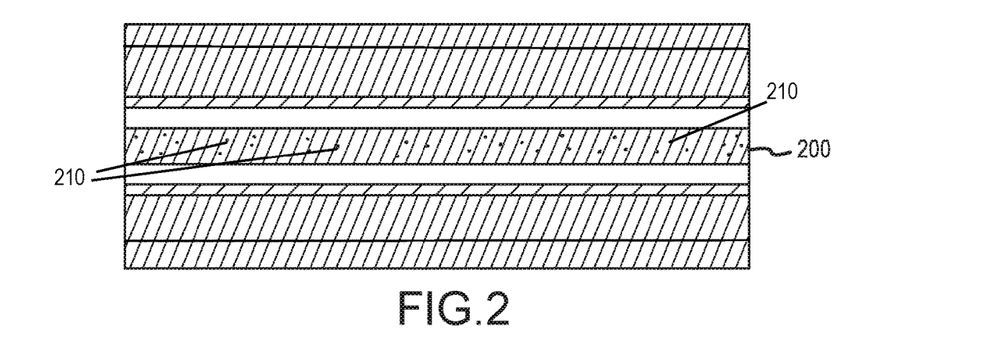
FIG. 2 shows a top view of a portion of an illuminated camera subassembly glass.

As seen in FIG. 2, the captured images of the illuminated camera assembly may be taken from a top-down view of the assembly. FIG. 2 shows the full camera subassembly. The single center band in the middle (200) is the glass which may contain dust/defects. Dust/defects in this area will be bright spots when the illumination is turned on. The bands above and below the center area are the reflectors inside the camera subassembly. These are shown as un-shaded because they are reflecting the light (illumination) of the LEDs back up into the high resolution camera. The actual LEDs in the camera subassembly are not visible in these figures. The next bands, (the striped bands above and below the un-shaded bands at the top and bottom edges of the figure), represent the plastic body of the camera subassembly. There are a few different bands shown because of height differences of different components within the camera subassembly and the illumination. The final outside bands represent the mat underneath the camera subassembly. This is part of the fixture and not part of the camera subassembly. FIG. 2 illustrates an image of the subassembly glass 200, showing defects 210 located either on top of or beneath the glass of the subassembly. The control unit 140 performs an initial analysis of the image, and identifies the location of potential defects 210. Alternatively, the control unit may include a manual input for a user to manually select areas of potential defects within the image. Regions of interest (ROI) around these areas of potential defects, whether identified by the control unit or manually selected by an input into the control unit, are then determined. These ROI may be automatically determined by the programs running on the control unit, or may be manually selected by the user.

Figure 3:
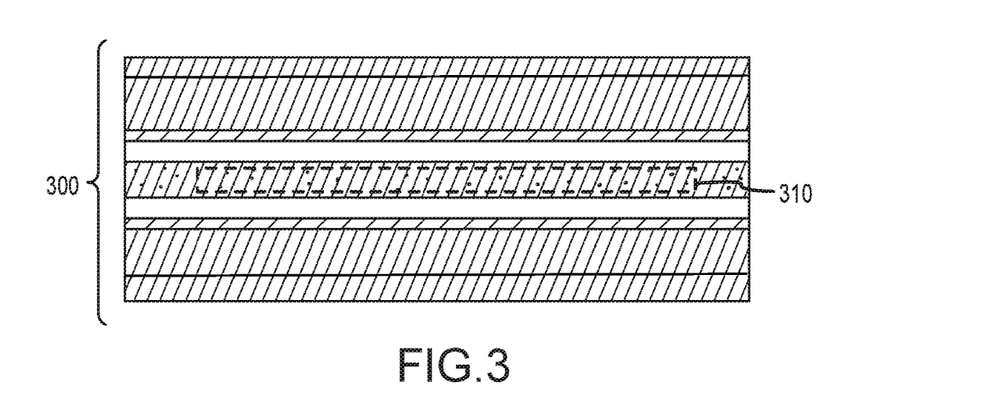
FIG. 3 shows an exemplary region-of-interest (ROI).

FIG. 3 is an illustration of an example ROI taken around an area of potential defects within a captured image. As seen in FIG. 3, an ROI 310 may be selected from within the overall captured image 300 of the subassembly. This selected ROI 310 may encompass all areas of the captured image having potential defects. Although FIG. 3 illustrates only one ROI, multiple ROI may be selected when there are multiple potential defect locations within the image. The area outside the lined rectangle shows what is not part of the ROI, and therefore will not be analyzed. In most situations only one ROI is necessary because of the precision afforded by the invention.

Figure 4:
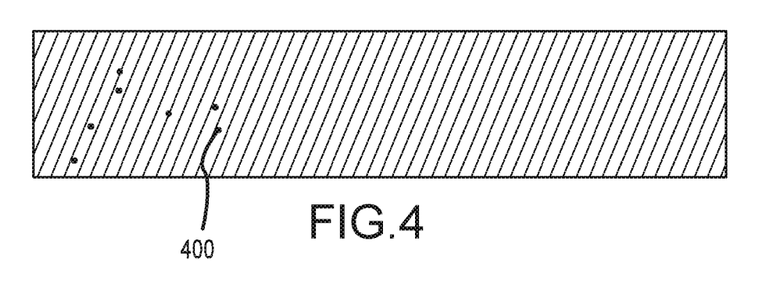
FIG. 4 shows an enhanced region-of-interest, which shows detected particles.
Figure 5:
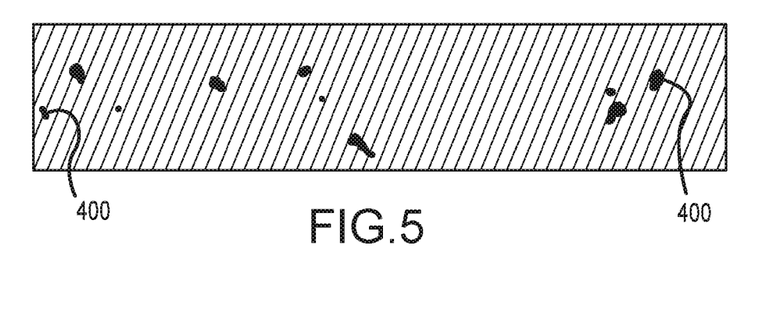
FIG. 5 provides a zoomed in pictures of particles detected by Particle Detection and Defect Characterization software.

After the ROI have been determined and selected, the control unit 140 and software modules therein perform enhancement of the ROI in order to more clearly identify the particles or other defects in the captured images. As can be more clearly seen in FIG. 4, defects 400 are located and identified. FIG. 5 illustrates a zoomed in view of the locations of the defects 400 in FIG. 4. As seen in FIG. 5, the defect location includes multiple defects of varying sizes.

Figure 6:
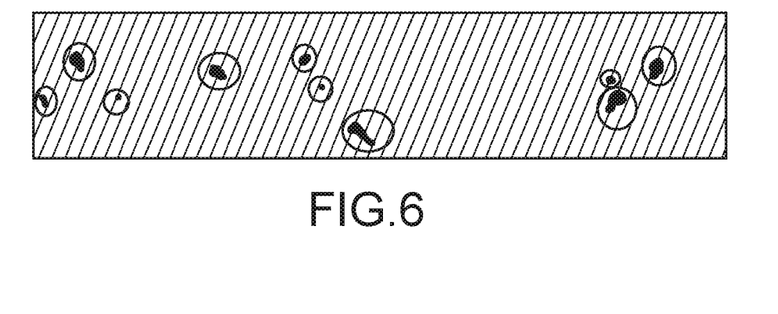
FIG. 6 shows a post-processed Region-of-Interest (Zoomed-In).
Figure 7:
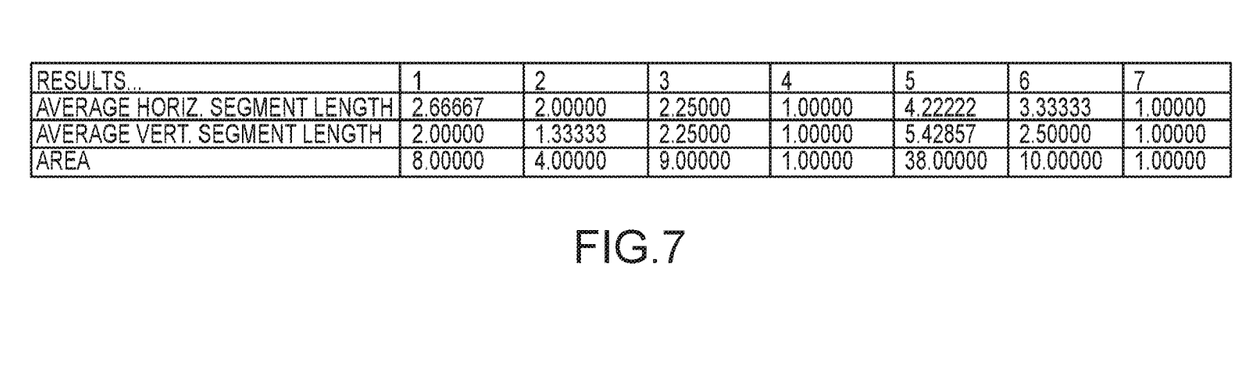
FIG. 7 provides a partial list of results from the processing.

FIG. 6 illustrates a post-processed image of a region of interest. The processing performed on the image (as seen in FIG. 5) to determine the size, location, and number of defects on the image. FIG. 5 shows the thresholding process whereas FIG. 6 is the particle analysis within the ROI. FIG. 7 provides the list of results obtained from the processing step.

As seen in FIG. 7, the control unit 140 analyzes the captured images and stores data regarding the location, number, and severity of defects within a memory. Based on the stored information, the control unit then processes the data from the images in view of predetermined criteria. Depending on whether the data from the meets the criteria, the control unit determines whether the camera assembly being analyzed is sufficient to be installed within an imaging device, or whether the defects therein are such that the camera assembly is not fit for installation. The data reported in FIG. 7 show the size and area of the defects, in pixels. These values can easily be converted and reported in mm, since the effective resolution (DPI) of the system is known.

Figure 8A:
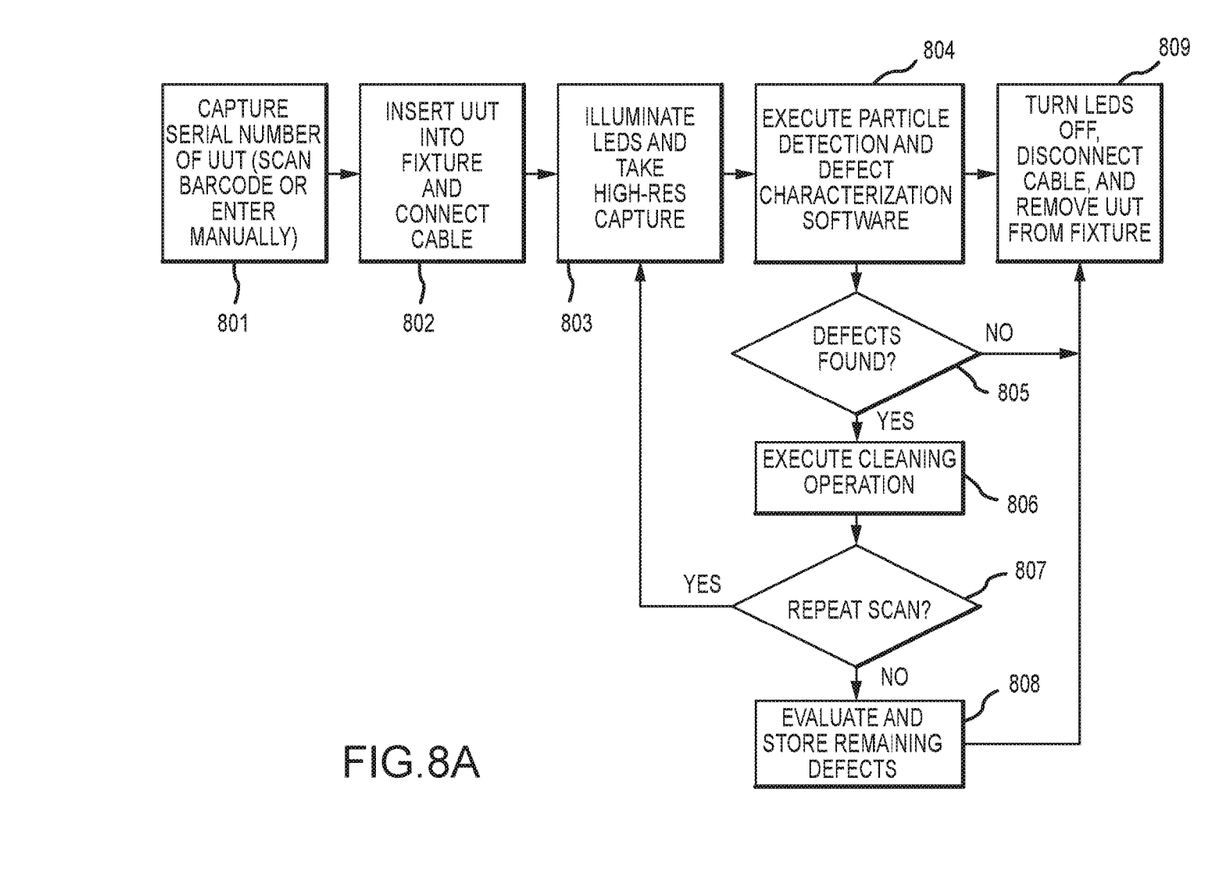
FIG. 8A provides a flow chart of the operator workflow.

FIG. 8A shows a flow chart of the overall workflow of the steps used to test a camera subassembly for anomalies. At step 801, a serial number of the camera subassembly unit under test ("UUT") is captured. This step may be accomplished by a user scanning a barcode or entering the serial number manually into control unit 140, or by the control unit detecting the UUT serial number using camera 120. At step 802, the UUT is inserted into fixture assembly 110, and a cable is connected to connect control circuitry 130 with the UUT. At step 803, control circuitry 130 illuminates LEDs within the camera subassembly, and high resolution camera 120 takes a high resolution capture of the camera subassembly. At step 804, control circuitry 130 executes particle detection and defect characterization software to identify any defects in the UUT. At step 805, if the software has not found any defects, the process proceeds to step 809. If defects are found, the software instructs the control unit to begin a cleaning operation for the camera.

At step 807, the control circuitry will determine whether an additional scan is needed based on a combination of some or all of the following: the number of defects detected, the type or severity of defects detected, whether a preset number of scanning and cleaning cycles have executed, or whether a user-set number of scanning and cleaning cycles has executed. If the circuitry determines a repeat scan is needed, processing returns to step 803 to allow an additional high-resolution capture to be taken. If not, processing proceeds to step 808. At step 808, any defects that remained present in the camera following the cleaning cycle are identified and analyzed by the control circuitry for reporting to the user. At step 809, the control circuitry deactivates the LEDs within the camera subassembly, and the user disconnects the UUT from the control circuitry and removes it from the fixture.

Figure 8B:
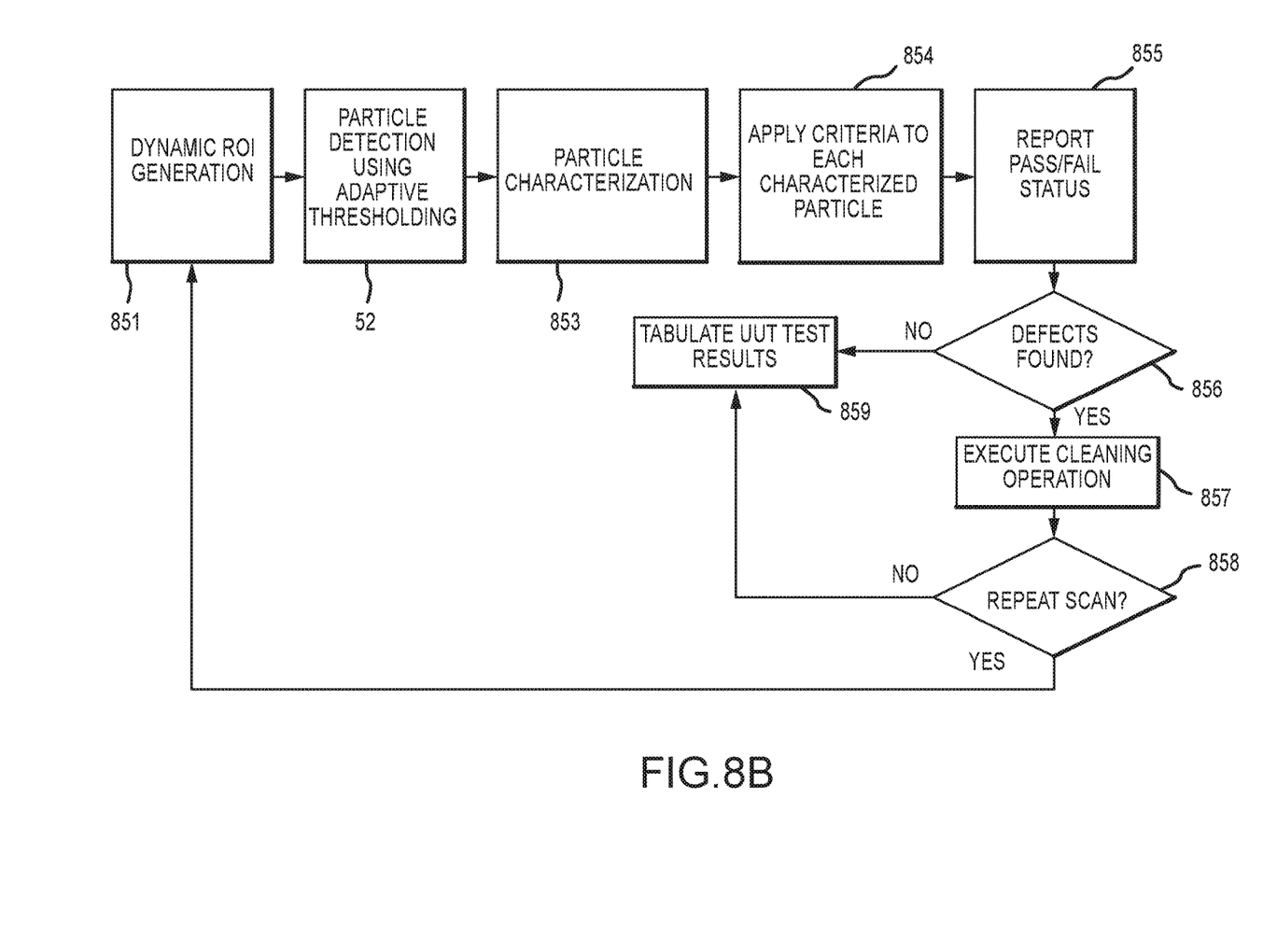
FIG. 8B provides a flow chart of the particle detection and defect characterization software.

FIG. 8B shows a flowchart of the particle and defect characterization software. At step 851, a region of interest is generated and then adaptive thresholding is used at step 852 to detect anomalies such a dust particles or scratches. The anomalies are characterized at step 853, and predetermined criteria is applied to the anomalies at step 854 to determine whether the camera subassembly would pass or fail (e.g. if passes, the camera subassembly is considered acceptable to be mounted into an imaging device). At step 855, pass/fail status is reported to the user. At step 856, if the unit is in a fail status, or, depending on user preferences or default settings, if defects have been identified in the camera sufficient to require cleaning, then at step 857 a cleaning operation is performed. If not, the UUT test results are tabulated at step 859 and stored or presented to the user. At step 858, after cleaning operation 857 is executed, the software determines whether an additional scan is needed based on a combination of some or all of the following: the number of defects detected, the type or severity of defects detected, whether a preset number of scanning and cleaning cycles have executed, or whether a user-set number of scanning and cleaning cycles has executed. If not, the UUT test results are tabulated at step 859 and stored or presented to the user. If an additional scan is needed, then processing returns to step 851 to perform the additional scan.

The invention claimed is:

1. A system for inspecting and cleaning a camera subassembly, the system comprising:
   a) a fixture for holding a camera subassembly having glass, in a position for the glass to be inspected for an anomaly which could affect image quality;
   b) a high resolution camera held by the fixture and configured to capture high resolution images of the camera subassembly glass;
   c) control circuitry configured to provide power to control illumination elements during the inspection for the anomaly;
   d) a control device connected to the control circuitry and the high resolution camera, wherein the control device comprises a processor and memory, wherein the processor in the control device executes software modules stored in the memory to: control the high resolution camera, capture images of the camera subassembly glass taken by the high resolution camera, determine a fail state if the anomaly is above a predetermined threshold, and compare the anomaly against the predetermined threshold upon a cleaning of the camera subassembly glass.

2. The system of claim 1, wherein the camera subassembly has an identifying serial number capable of entry into the system by at least one of: a scanned barcode, manual entry of the serial number, and detecting the serial number using the high resolution camera.

3. The system of claim 1, wherein the predetermined threshold can be obtained automatically using preset values or by manual input.

4. The system of claim 1, wherein the predetermined threshold is set at a maximum segment length and the anomaly which could affect image quality includes dust particles as small as 0.20 mm.

5. The system of claim 1, wherein the control device comprises a particle detection and defect characterization software module configured to iteratively analyze a location of the anomaly and instruct the cleaning upon determination of the fail state.

6. The system of claim 1, wherein the control device and software modules therein are configured to: determine a region of interest (ROI) on the camera subassembly glass by using at least one reference point on the camera subassembly glass; and apply predetermined particle characteristics to distinguish dust from scratches or other contaminants in the ROI.

7. The system of claim 5, wherein the particle detection and defect characterization software module is configured to locate suitable areas of the camera subassembly glass to inspect for the anomaly.

8. The system of claim 1, wherein the control device and software modules therein are configured to locate and tabulate characteristics of the anomaly.

9. The system of claim 6, wherein the control device and software modules therein are configured to enhance the ROI to identify particles or other defects in the captured images.

10. A method of iteratively inspecting and cleaning a camera subassembly, the method comprising:
    a) capturing an image, with a high resolution camera, of a glass element of the camera subassembly;
    b) determining a region of interest (ROI) on the glass element by using at least one reference point on the glass element;
    c) locating and measuring an anomaly, in the ROI, that could affect quality of the image;
    d) determining, by a control device, a fail state if the anomaly is above a predetermined threshold;
    e) cleaning, upon determination of the fail state, the glass element and re-measuring the anomaly; and
    f) determining, by the control device, whether an additional re-measuring of the anomaly is needed.

11. The method of claim 10, wherein the determining whether an additional re-measuring of the anomaly is needed is based on at least one of: a number of anomalies detected, a type or severity of anomalies detected, and comparison against a predetermined number of measuring and cleaning cycles.

12. The method of claim 10, further comprising:
    capturing an identifying serial number of the camera subassembly, wherein the capturing of the serial number comprises at least one of: scanning a barcode, manual entry of the serial number, and detecting the serial number using the camera.

13. The method of claim 10, further comprising:
    applying predetermined particle characteristics to distinguish dust from scratches or other contaminants in the ROI.

14. The method of claim 10, further comprising:
    obtaining the predetermined threshold, the obtaining performed automatically using preset values or by manual input.

15. The method of claim 10, wherein the predetermined threshold is set at a maximum segment length and the anomaly which could affect image quality includes dust particles as small as 0.20 mm.

16. The method of claim 10, wherein a particle detection and defect characterization software module iteratively determines a location of the anomaly and instructs the cleaning upon determination of the fail state.

17. The method of claim 10, further comprising:
obtaining the number of camera subassembly cleaning cycles automatically using preset values or by manual input.

18. The method of claim 10, wherein the ROI is defined by a coordinate system and determined automatically by the control device or by user input.

19. The method of claim 10, further comprising:
enhancement of the ROI to identify particles or other defects in the captured images.

20. The method of claim 10, further comprising:
reporting the fail state.

* * * * *